(12) United States Patent
Chiang

(10) Patent No.: US 7,589,919 B2
(45) Date of Patent: Sep. 15, 2009

(54) LENS MODULE, METHOD FOR ASSEMBLING SAME AND CAMERA MODULE HAVING SAME

(75) Inventor: Tsung-Wei Chiang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 18 days.

(21) Appl. No.: 11/692,054

(22) Filed: Mar. 27, 2007

(65) Prior Publication Data
US 2008/0151396 A1    Jun. 26, 2008

(30) Foreign Application Priority Data
Dec. 20, 2006    (CN) .................. 200610157709.8

(51) Int. Cl.
*G02B 7/02*    (2006.01)
(52) U.S. Cl. .................. 359/811; 359/823; 359/819
(58) Field of Classification Search ......... 359/694–701, 359/811, 819–823
See application file for complete search history.

(56) References Cited

U.S. PATENT DOCUMENTS

| 4,385,023 | A | * | 5/1983 | Sumi | .................. 264/221 |
| 4,682,214 | A | * | 7/1987 | Sato et al. | .................. 348/175 |
| 7,164,545 | B2 | | 1/2007 | Saito | .................. 359/794 |
| 2003/0072091 | A1 | | 4/2003 | Abe | |
| 2006/0181633 | A1 | | 8/2006 | Seo | |
| 2007/0058070 | A1 | * | 3/2007 | Chen | .................. 348/340 |

* cited by examiner

*Primary Examiner*—Mohammed Hasan
(74) *Attorney, Agent, or Firm*—Frank R. Niranjan

(57) ABSTRACT

An exemplary lens module includes a stationary lens assembly and a moveable lens assembly. The stationary lens assembly includes at least one first lens and a first barrel receiving the at least one first lens therein. The movable lens assembly includes at least one second lens and a second barrel receiving the at least one second lens therein. The at least one second lens has a greater optical tolerance than that of the at least one first lens, the second barrel is in threaded engagement with the first barrel. A method for assembling the lens module, and a camera module using the lens module are also provided.

13 Claims, 4 Drawing Sheets

LENS MODULE, METHOD FOR ASSEMBLING SAME AND CAMERA MODULE HAVING SAME

BACKGROUND

1. Technical Field

The present invention relates to a lens module, a method for assembling the lens module and a camera module using the lens module.

2. Description of Related Art

With the ongoing development of microcircuitry and multimedia technology, camera modules such as still cameras and digital cameras are in widespread use or being combined with various electronic devices. Such camera modules are needed to satisfy requirements of compactness, low cost, and excellent optical performance.

A camera module of the related art includes at least one lens module and an image sensor module. The lens module is basically composed of a barrel, and lenses, spacers and an aperture received in the barrel. The image sensor module includes a holder and an image sensor received in the holder. The lens module and the image sensor module are preferably aligned with each other along an optical axis, i.e., concentrically aligned. A fixed focus camera module usually uses one lens module with a barrel thereof being threadedly engaged with a holder of an image sensor module. The barrel may be secured to a position in the holder by applying an adhesive, or movable relative to the holder under a driving device to achieve a focusing function. A zooming camera module usually uses two or more lens modules, the barrels may be driven by motors to move relative to each other as well as the image sensor, thereby achieving a zooming function.

However, the fixed focus camera module or the zooming camera module mentioned above does not take lens optical tolerance into consideration. The smaller the optical tolerance is, the greater influence of decentration on the lens optical performance will be. Thereby, during assembly, focusing or zooming of the lens module, the movement of the lens with smaller optical tolerance will easily lead to loss of concentricity and reducing image quality.

What is needed, therefore, is a lens module which takes optical tolerance into consideration and a method for assembling the lens module.

What is also needed is a camera module using the lens module.

SUMMARY

In a preferred embodiment, an exemplary lens module includes a stationary lens assembly and a moveable lens assembly. The stationary lens assembly includes at least one first lens and a first barrel receiving the at least one first lens therein. The movable lens assembly includes at least one second lens and a second barrel receiving the at least one second lens therein. The at least one second lens has a greater optical tolerance than that of the at least one first lens, the second barrel is in threaded engagement with the first barrel.

In a another preferred embodiment, an exemplary method for assembling the lens module includes steps of: disposing at least one first lens into a first barrel, thereby obtaining a stationary lens assembly; disposing at least one second lens into a second barrel, thereby obtaining a movable lens assembly, the at least one second lens being of a greater optical tolerance than that of the at least one first lens; threadedly engaging the second barrel with the first barrel; and adjusting the movable lens assembly relative to the stationary lens assembly so as to optically align the at least one second lens with the at least one first lens.

In a further preferred embodiment, an exemplary camera module includes a stationary lens assembly, a moveable lens assembly and an image sensor. The stationary lens assembly includes at least one first lens and a first barrel receiving the at least one first lens therein. The movable lens assembly includes at least one second lens and a second barrel receiving the at least one second lens therein. The at least one second lens has a greater optical tolerance than that of the at least one first lens, the second barrel is in threaded engagement with the first barrel. The image sensor is configured for detecting light from the at least one first lens and the at least one second lens.

Other advantages and novel features of the present invention will become more apparent from the following detailed description of preferred embodiment when taken in conjunction with the accompanying drawings.

BRIEF DESCRIPTION OF THE DRAWINGS

Many aspects of the lens module, the method and the camera module can be better understood with reference to the following drawings. The components in the drawing are not necessarily drawn to scale, the emphasis instead being placed upon clearly illustrating the principles of the present lens module, method and camera module. Moreover, in the drawings, like reference numerals designate corresponding parts throughout the several views.

DETAILED DESCRIPTION OF THE PREFERRED EMBODIMENTS

Embodiments of the present lens module, method and camera module will now be described in detail below and with reference to the drawings.

Figure 1:
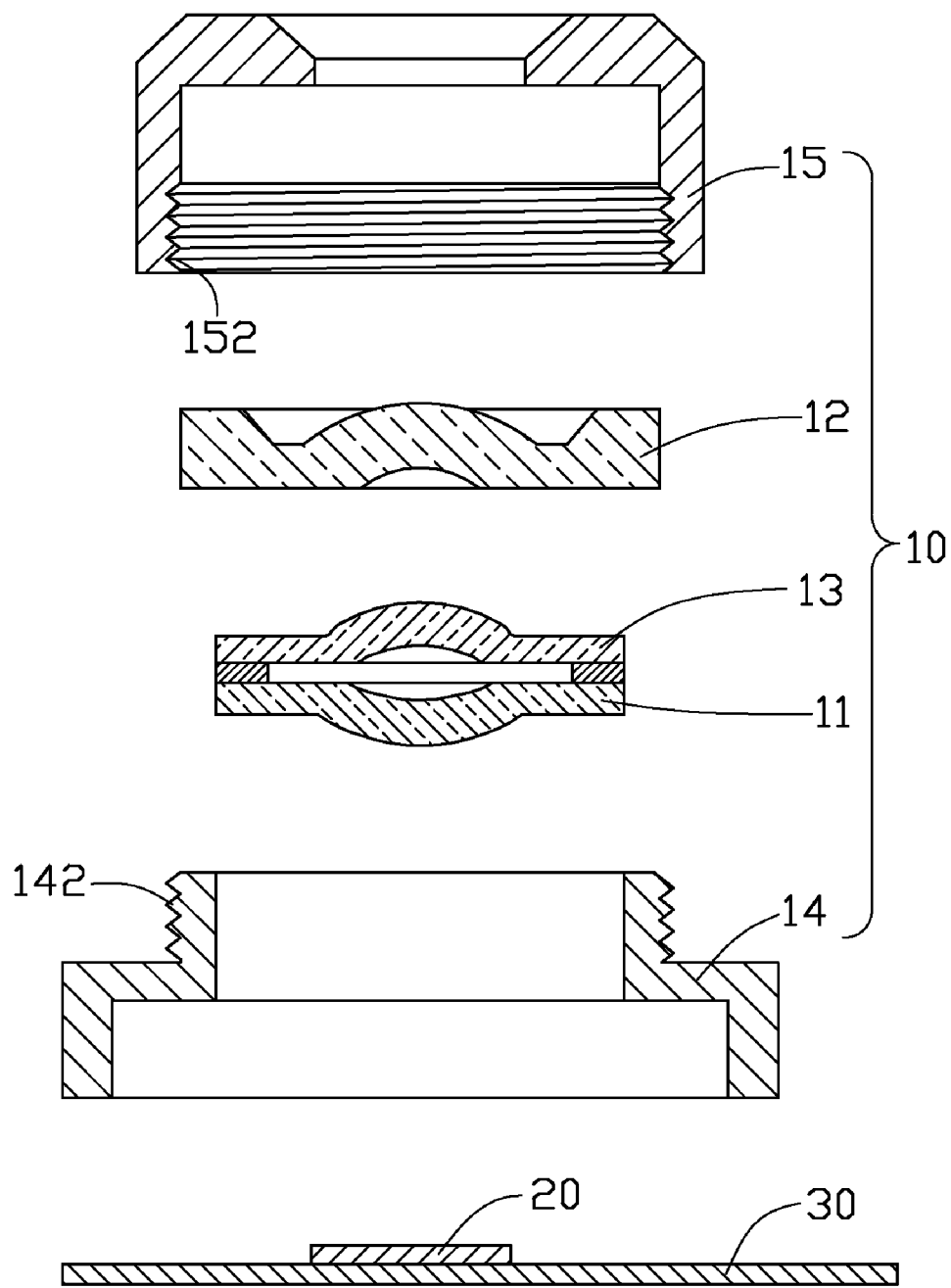
FIG. 1 is an exploded view of a camera module according to a first preferred embodiment of the present invention.
Figure 2:
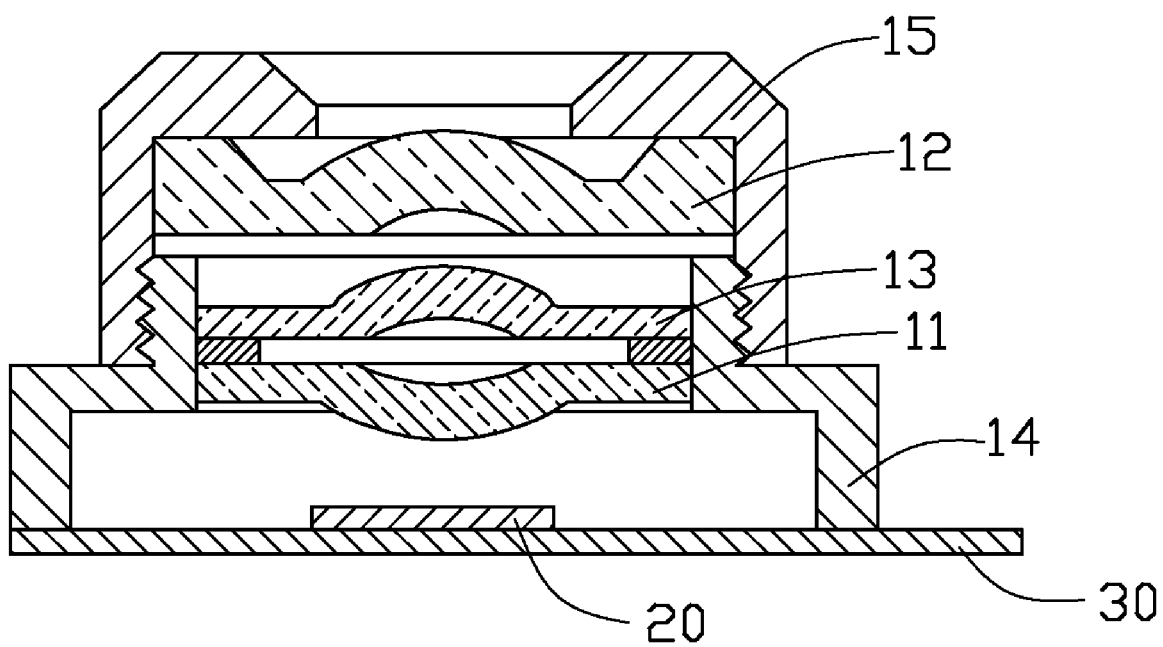
FIG. 2 is an assembled view of the camera module in FIG. 1.

Referring to FIGS. 1 and 2, an exemplary camera module 100 according to a first preferred embodiment includes a lens module 10, an image sensor 20, and a circuit board 30.

The lens module 10 includes a first lens 11, a second lens 12, a third lens 13, a first barrel 14 receiving the first lens 11 and the third lens 13, and a second barrel 15 receiving the second lens 12.

The first lens 11, the second lens 12 and the third lens 13 can all be made of plastic or glass and have a spherical or aspherical shape. An optical tolerance of the second lens 12 can be greater than that of both of the first lens 11 and the third lens 13. Alternatively, the optical tolerance of the second lens 12 can be greater than an optical tolerance of an assembly of the first and third lenses 11, 13. An optical tolerance of a single lens may be changed in different design parameters, for example, a different curvature or thickness of the lens will change the optical tolerance thereof. An optical tolerance of a lens assembly may also be changed in different order to match the lenses thereof.

The first barrel 14 and the second barrel 15 each can be made of plastic. The first barrel 14 has threads 142 defined on an outer wall thereof, and the second barrel 15 has threads 152 defined in an inner wall thereof. The second barrel 15 is threadedly engaged with the outer wall of first barrel 14.

The image sensor 20 can be selected from charge coupled cevice (CCD for short) or complementary metal oxide semiconductor transistor (CMOS for short). The image sensor 20 is electronically attached to the circuit board 30 and configured for detecting light from the first lens 11, the second lens 12 and the third lens 13, and then outputting an image electrical signal.

A method for assembling of the camera module 100 may include steps as follows:

(1) disposing the first and third lenses 11, 13 into the first barrel 14;

(2) disposing the second lens 12 into the second barrel 15;

(3) applying the image sensor 20 onto the circuit board 30;

(4) attaching the first barrel 14 onto the circuit board 30;

(5) threadedly engaging the second barrel 15 with the first barrel 14; and (6) adjusting the second barrel 15 relative to the first barrel 14 so as to optically align the second lens 12 with the first and third lenses 11, 13.

In the above step (4), the first barrel 14 is attached onto the circuit board 30, which holds the first barrel 14, the first and third lenses 11, 13 stationary. The second barrel 15 is used to adjust a distance from the first barrel 14 during the assembly, i.e., the second barrel 15 and the second lens 12 are movable relative to the first barrel 14, the first and third lenses 11, 13. In this way, the second lens 12 with a greater optical tolerance focuses by moving relative to the first and third lenses 11, 13 with smaller optical tolerances, the first and third lenses 11, 13 with smaller optical tolerances can thus avoid movement, in this way, during the assembly, loss of concentricity can be reduced.

Furthermore, when an adhesive such as glue (not shown) is applied between the second barrel 15 and first barrel 14 after step (6), the second barrel 15 is secured to the first barrel 14, so the camera module 100 becomes a fixed focus module.

Figure 3:
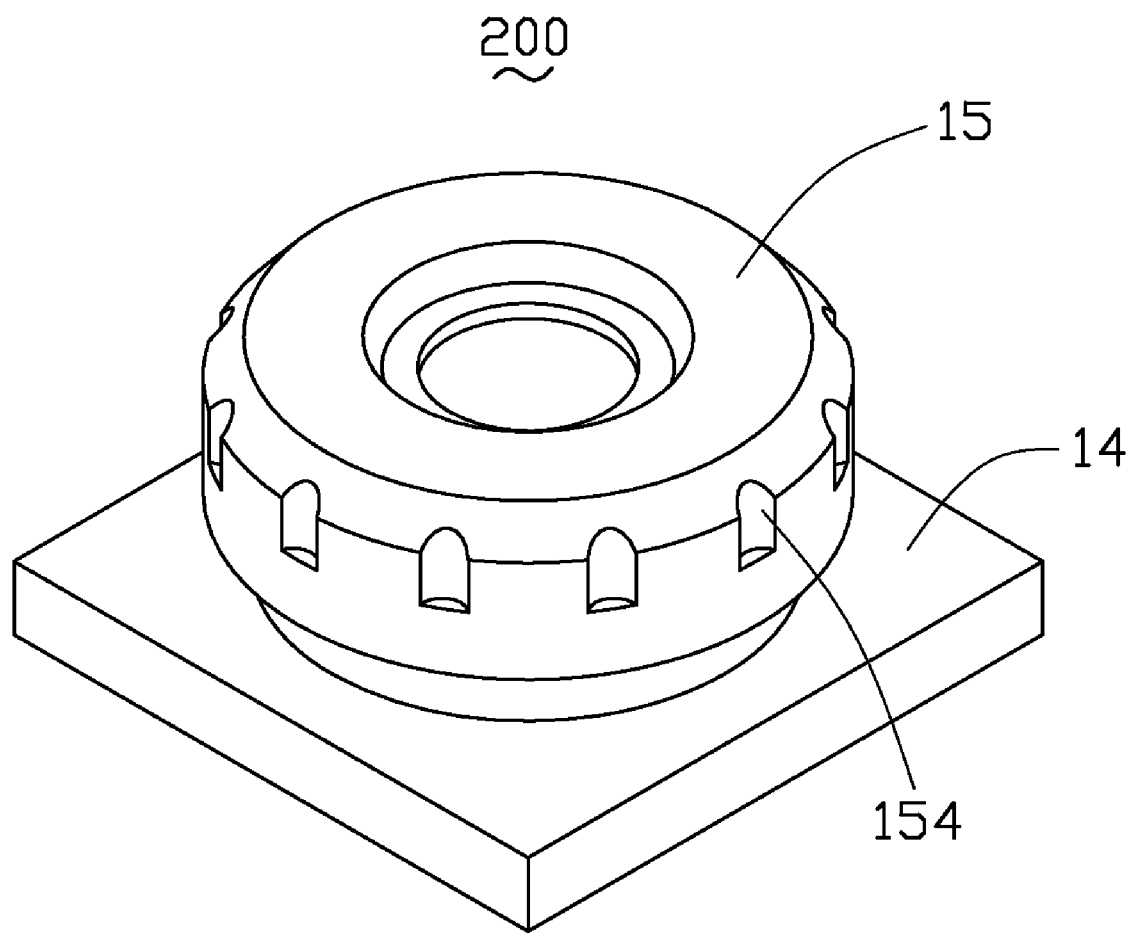
FIG. 3 is an assembled view of a camera module according to a second preferred embodiment of the present invention.

Referring to FIG. 3, an exemplary camera module 200 according to a second preferred embodiment is shown. The camera module 200 is essentially similar to the camera module 100 illustrated in the first preferred embodiment, however, the application of adhesive between the second barrel 15 and first barrel 14 is avoided, and a number of recesses 154 are defined in an outer wall at an object side of the second barrel 15, such that the second barrel 15 can engage with a tool for adjusting a distance from the first barrel 14, i.e., the second lens 12 with a greater optical tolerance focuses by moving relative to the first and third lenses 11, 13 with smaller optical tolerances during assembly and use of the camera module 200, the camera module 200 also has a zooming function.

Figure 4:
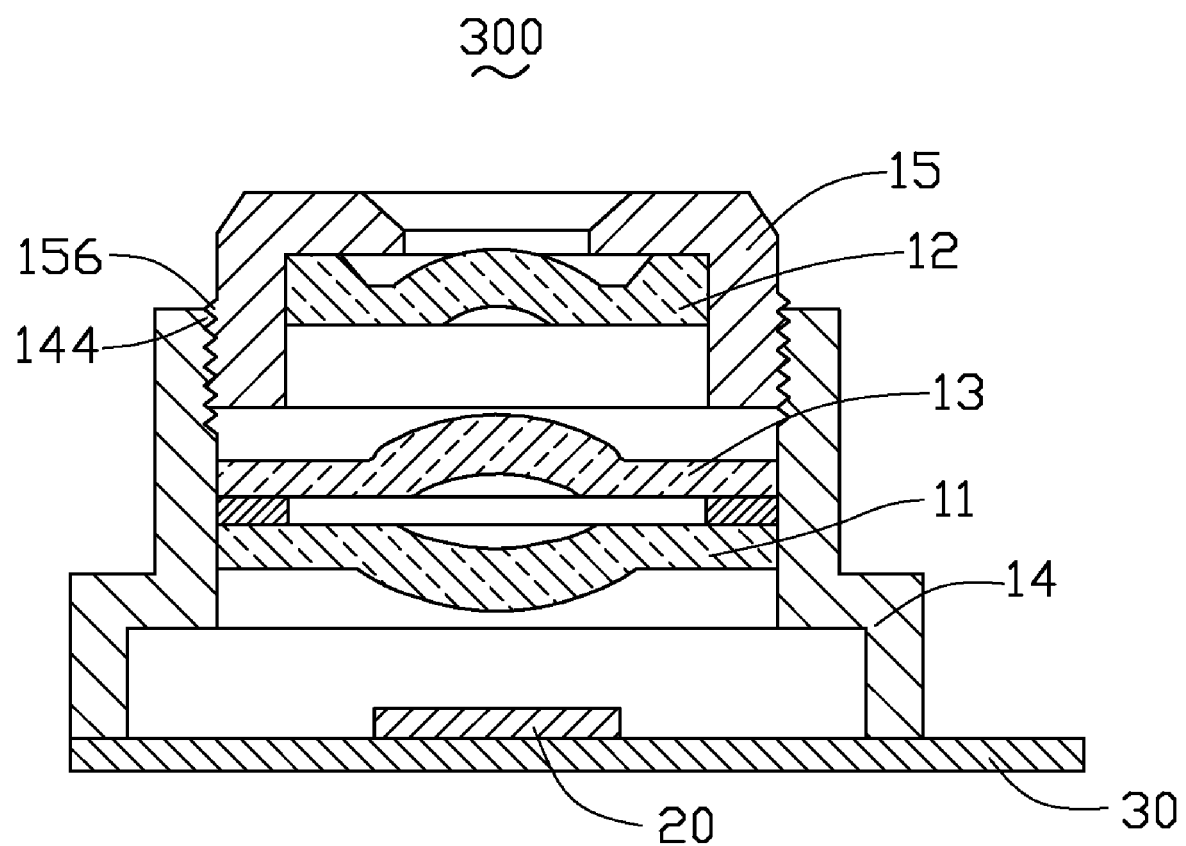
FIG. 4 is an assembled view of a camera module according to a third preferred embodiment of the present invention.

FIG. 4 shows an exemplary camera module 300 according to a third preferred embodiment. The camera module 300 is essentially similar to the camera module 100 illustrated in the first preferred embodiment, however, the first barrel 14 has threads 144 defined in an inner wall thereof, the second barrel 15 has threads 156 defined on an outer wall thereof, the second barrel 15 is engaged in the inner wall of first barrel 14.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A lens module comprising:
   a stationary lens assembly including at least one first lens and a first barrel receiving the at least one first lens therein;
   a movable lens assembly including at least one second lens and a second barrel receiving the at least one second lens therein, the at least one second lens with a greater optical tolerance than that of the at least one first lens, the second barrel being in threaded engagement with the first barrel.

2. The lens module as described in claim 1, wherein the first barrel has threads defined on an outer wall thereof, the second barrel has threads defined in an inner wall thereof, and the second barrel is engaged with the outer wall of the first barrel.

3. The lens module as described in claim 1, wherein the first barrel has threads defined in an inner wall thereof, the second barrel has threads defined on an outer wall thereof, and the second barrel is engaged in the inner wall of the first barrel.

4. The lens module as described in claim 1, wherein an adhesive is applied between the second barrel and the first barrel, and the at least one second lens is spaced a distance from the at least one first lens.

5. The lens module as described in claim 1, wherein a plurality of recesses are defined in an outer wall at an object side of the second barrel for facilitating adjusting a distance between the at least one second lens and the at least one first lens using a tool.

6. A method for assembling a lens module, comprising steps of:
   disposing at least one first lens into a first barrel, thereby obtaining a stationary lens assembly;
   disposing at least one second lens into a second barrel, thereby obtaining a movable lens assembly, the at least one second lens being of a greater optical tolerance than that of the at least one first lens;
   threadedly engaging the second barrel with the first barrel; and
   adjusting the movable lens assembly relative to the stationary lens assembly so as to optically align the at least one second lens with the at least one first lens.

7. The method as described in claim 6, further comprising the step of applying an adhesive between the second barrel and the first barrel.

8. A camera module comprising:
   a stationary lens assembly including at least one first lens and a first barrel receiving the at least one first lens therein;
   a movable lens assembly including at least one second lens and a second barrel receiving the at least one second lens therein, the at least one second lens with a greater optical tolerance than that of the at least one first lens, the second barrel being in threaded engagement with the first barrel; and
   an image sensor for detecting light from the at least one first lens and the at least one second lens.

9. The camera module as described in claim 8, wherein the first barrel has threads defined on an outer wall thereof, the second barrel has threads defined in an inner wall thereof, and the second barrel is engaged with the outer wall of the first barrel.

10. The camera module as described in claim 8, wherein the first barrel has threads defined in an inner wall thereof, the second barrel has threads defined on an outer wall thereof, and the second barrel is engaged in the inner wall of the first barrel.

11. The camera module as described in claim 8, wherein an image sensor is electronically attached to a circuit board and the first barrel is attached to the circuit board.

12. The camera module as described in claim 8, wherein an adhesive is applied between the second barrel and the first barrel, and the at least one second lens is spaced a distance from the at least one first lens.

13. The camera module as described in claim 8, wherein a plurality of recesses are defined in an outer wall at an object side of the second barrel for facilitating adjusting a distance between the at least one second lens and the at least one first lens using a tool.

* * * * *